United States Patent Office 2,894,280
Patented July 14, 1959

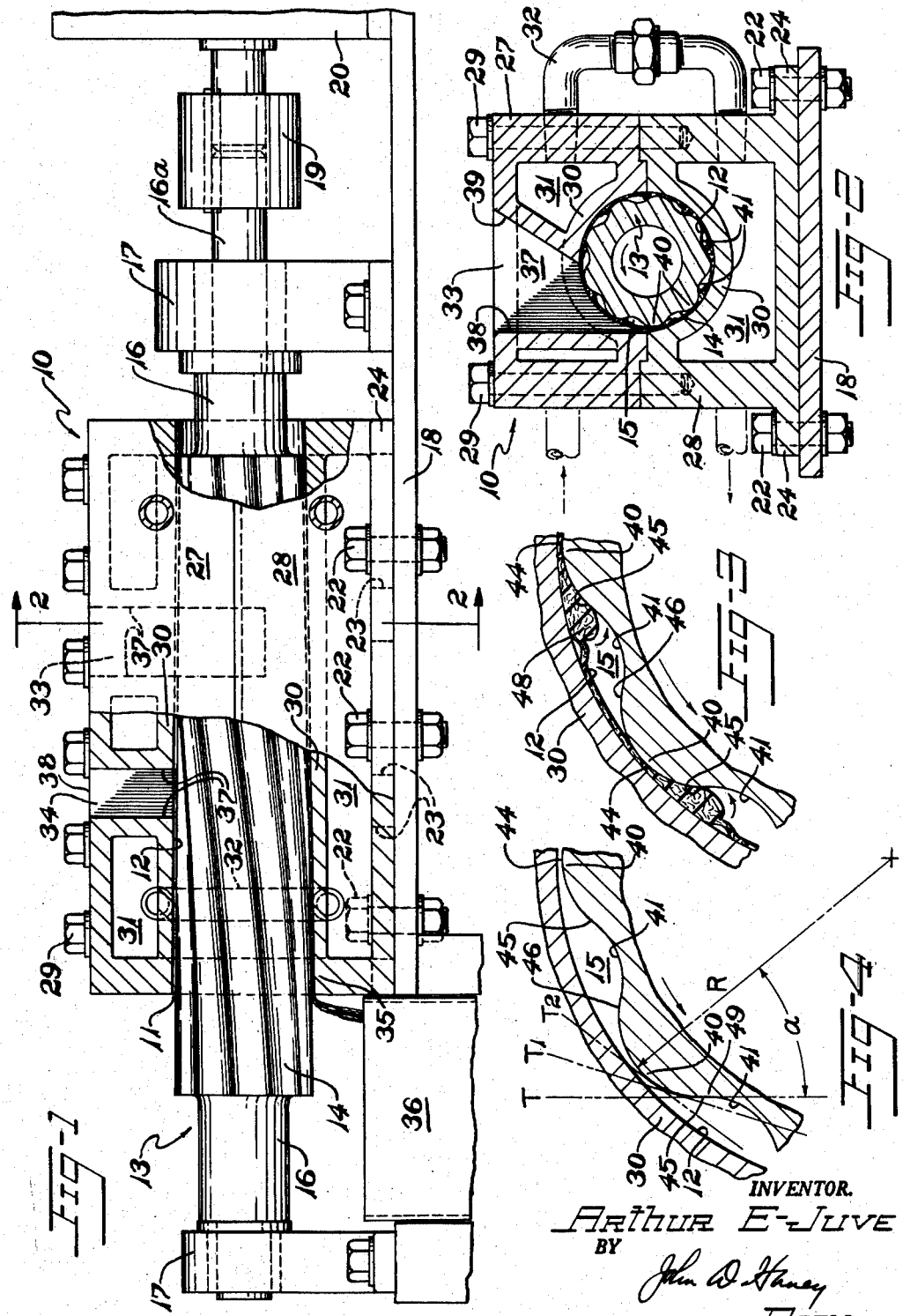

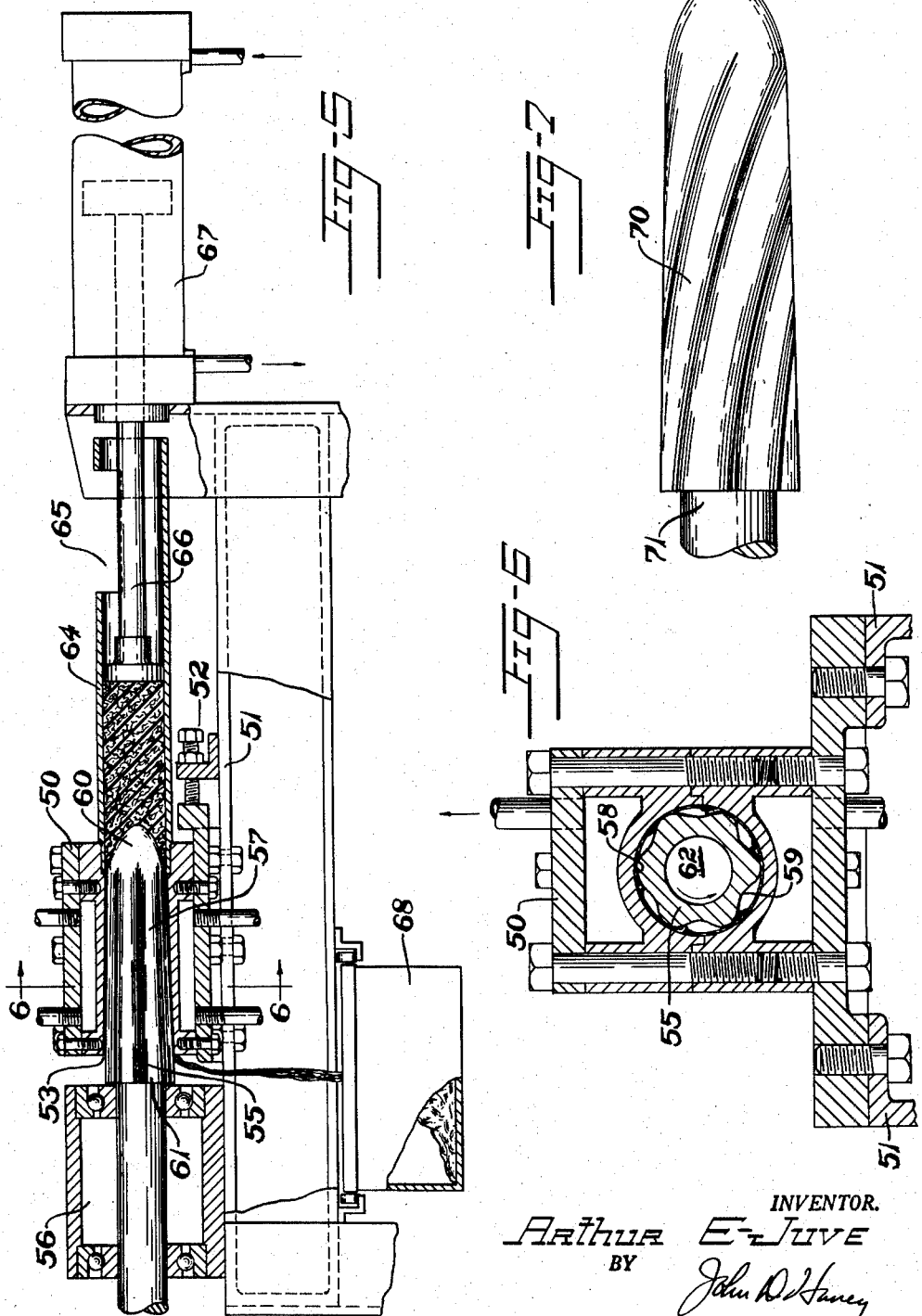

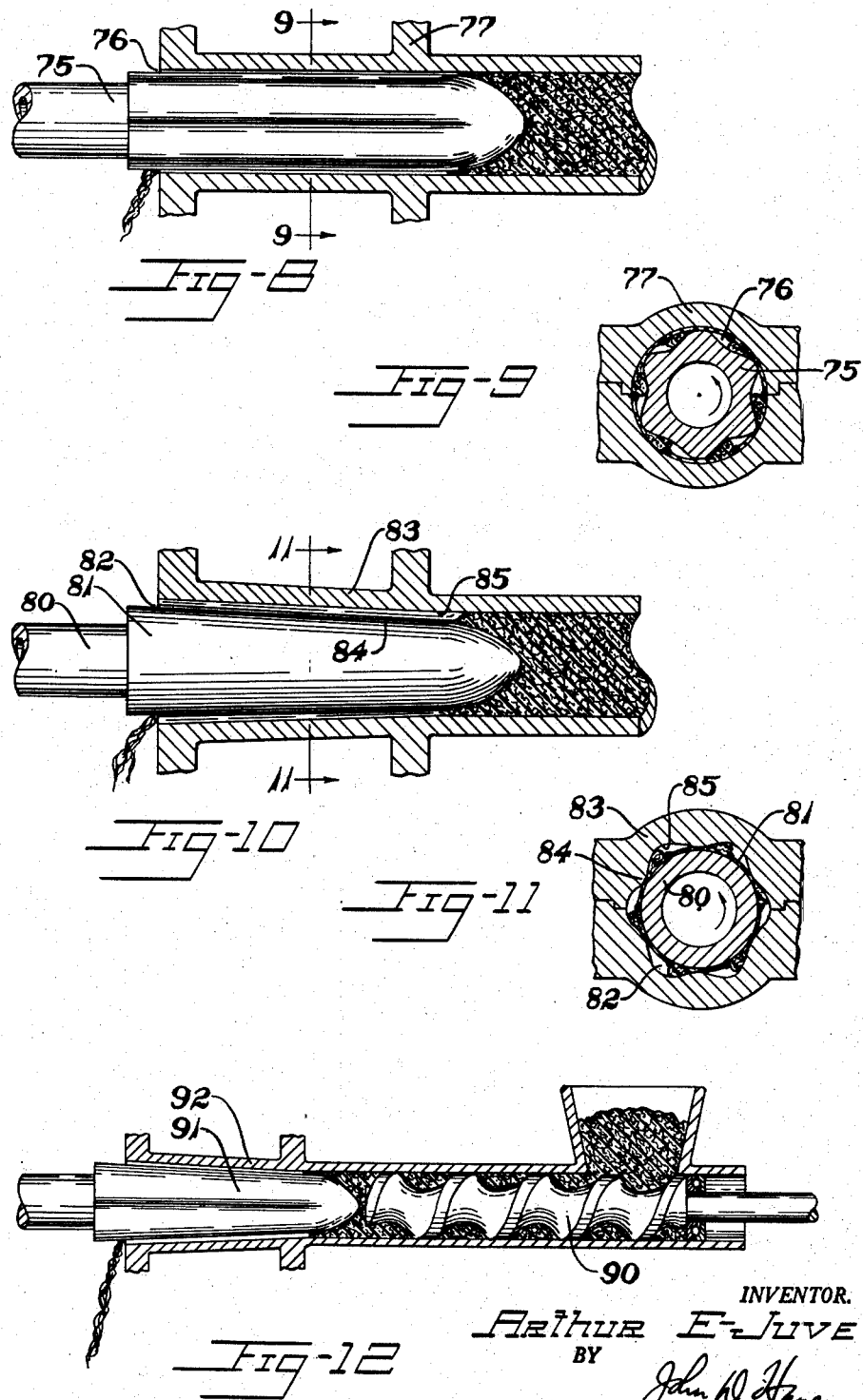

2,894,280

MIXING RUBBER

Arthur E. Juve, Akron, Ohio, assignor to The B. F. Goodrich Company, New York, N.Y., a corporation of New York Application September 8, 1953, Serial No. 378,975

15 Claims. (Cl. 18—2)

This invention relates to plasticizing and mixing plasticizable material such as rubberlike material. The invention has special utility for plasticizing and mixing and intimately blending rubber-like materials with each other and with various compounding ingredients used in manufacturing rubber products. Moreover, according to this invention such rubber stocks may be discharged from the mixing apparatus to subsequent processing operations in a continuous flow. The term "rubber" as used herein refers to extremely viscous materials characterized (at least before mixing) by the properties of nerve and extensibility, and includes natural rubber, and synthetic rubber-like materials such as the polymers of diolefins represented by the copolymer of butadiene and styrene (GR-S); polymers of chloroprene (Neoprene); copolymers of isobutylene and isoprene (Butyl); copolymers of butadiene and acrylonitrile (Buna N); etc. This application is a continuation-in-part of my copending application Serial No. 159,043, now abandoned; filed April 29, 1950.

The compounding and mixing of rubber on a scale suitable for commercial operations is presently accomplished throughout the rubber industry by what is known as "batch" mixing. For more than a century the open mill has been the standard equipment for this purpose while in more recent years Banbury mixers have become prominent for mixing rubber. The success of open mill mixing is to a large extent contingent on the skill and judgment of an operator and is relatively slow. Banbury mixing requires massive machinery and excessive amounts of power, and for efficient and economical operation, large quantities must be mixed in each batch. It is difficult to regulate the temperature of the mixture in batch mixing and the subsequent processing operations which receive the stock mixture must be regulated to accommodate the intermittent delivery to it of the mixed batches. The advantages of mixing rubber and supplying it to these subsequent processing stations in a continuous flow are obvious but prior to this invention there has been no equipment capable of blending or mixing the rubber to satisfactory commercial standards in a continuous flow.

Mixing equipment utilizing screws and the like have been proposed which operate successfully for continuously mixing many organic plastics such as the vinyl polymers, cellulose polymers and the like, but this equipment is inadequate for mixing rubber and rubber-like materials. Ordinarily rubber materials require some preliminary breaking down or mastication to reduce their viscosity before they can be blended successfully in a mixture, especially where ingredients mixed include finely-divided pigments, whereas the organic plastics noted in the preceding sentence do not require such mastication. Usually these plastic materials tend to soften readily under the influence of heat in mixing equipment and appear to wet pigments and the like rather easily so that a mixing action which consists essentially of merely folding these plastics and ingredients into each other is satisfactory but this mixing action is not suitable for rubber. There is also adequate equipment available for simply masticating or plasticizing rubber but the action of this masticating equipment is not suitable for performing the added function of adequate mixing.

According to this invention rubber and other plasticizable materials can be mixed, blended and plasticized in a single piece of equipment to acceptable commercial standards and discharged to subsequent processing equipment in a continuous flow. The preferred apparatus of this invention is characterized by a rotor having longitudinal ribs which rotates inside a passage extending through a stator. The improved mixing action as well as the mastication essential to efficient mixing of rubber and pigments is obtained in accordance with the principles of this invention by the cooperation of the face of the ribs which is presented to the rubber and the surface of the passage through the stator which surrounds the rotor and against which the rubber is mulled and worked by the ribs. As the rotor rotates inside the stator the face of each rib leading the rib in the direction of rotation is shaped to forcibly smear the ingredients of the mixture together against the walls of the stator and simultaneously stretch the mixture both circumferentially and lengthwise of the rotor. The power requirements do not exceed that required for mixing comparable quantities of rubber on open mills and are considerably less than that required for Banbury mixing. Further the temperature of the mixture can be accurately regulated with this equipment as well as the rate at which the mixing is accomplished so that the mixing may correspond to the operation of any particular subsequent processing equipment to which the mixture is to be delivered.

The invention will be more fully explained in connection with the accompanying drawings which illustrate preferred mixing apparatus constructed in accordance with and embodying the invention.

In the drawings:

Fig. 1 is a side elevation partially in section showing one preferred form of mixing equipment embodying this invention;

Fig. 2 is a cross-sectional view taken on the line 2—2 of Fig. 1;

Fig. 3 is a view showing the cross-sectional shape of the ribs on the mixing surface of the rotor, and illustrating the typical mixing action of the equipment;

Fig. 4 is another view showing the cross-sectional shape of the ribs on the mixing surface of the rotor and illustrating various details about the shape of the ribs;

Fig. 5 is a side elevation of another form of mixing equipment embodying the invention;

Fig. 6 is a cross-sectional view taken on the line 6—6 of Fig. 5;

Fig. 7 shows a side elevation of another preferred type of rotor which may be used in the equipment shown in Fig. 5;

Fig. 8 is a fragmentary view showing another form of rotor and portions of the corresponding stator in which it is positioned which may be used in practicing the invention;

Fig. 9 is a cross-sectional view taken on the line 9—9 of Fig. 8;

Fig. 10 is another view similar to Fig. 8 but showing another type of rotor and stator which may be used in practicing the invention;

Fig. 11 is a cross-sectional view taken on the line 11—11 of Fig. 10;

Fig. 12 is a fragmentary view showing the side elevation of a rotor and stator generally similar to that shown in Fig. 5 but having different mechanism for feeding rubber to the rotor and the stator.

The mixing equipment shown in Figs. 1 and 2 includes a stator 10 having an interior passage 11 formed by a smooth concavely-curved surface of revolution 12 of circular cross-sectional shape which extends through the stator from one end to the other. A rotor 13 extends coaxially through this passage in the stator and the rotor has a mixing surface 14 along the portion of the rotor surrounded by the surface 12. The interior surface 12 of the passage 11 and the mixing surface 14 of the rotor cooperate between them to define a mixing chamber 15 (see Fig. 2) which receives rubber and other ingredients of the mixture and in which the mixing is effected. The ends 16 of the rotor project beyond the ends of the stator and they are journalled in bearings 17 mounted on a frame 18 which also supports the stator. One end 16a of the rotor (the right end as it is viewed in Fig. 1) extends through its respective bearing 17 and is keyed to a coupling 19 engaged with a drive unit 20 which provides a source of power for rotating the rotor inside the passage 11.

The stator 10 is secured to the frame 18 by several bolts 22 which extend through slots 23 disposed longitudinally of the stator in the flanges 24 along the lower edges of the stator. The stator is constructed of an upper housing 27 and a lower housing 28, which are fastened together in mating relation as shown in Fig. 2 by cap screws 29. The upper and the lower housing each have a semi-circular wall 30 extending the length of the housing and when the housings are assembled together, the concave surfaces of these walls 30 cooperate to form the surface 12 which defines the passage 11 through which the rotor 13 extends. The upper housing may be removed from the assembly for cleaning, repairs, and inspections of the rotor by removing the cap screws 29. Both the upper and lower housing contain passages 31 connected by a conduit 32 through which steam or other thermal medium may be circulated to regulate the temperature at which the mixing is carried out.

The rubber and other materials to be mixed together during operation of the equipment are charged into the mixing chamber 15 in a continuous flow through the openings 33 and 34 which extend from the top surface of the stator downwardly into the mixing chamber. The rubber may be in the form of pellets, strips, small chunks or the like and suitable equipment (not shown) may be provided for feeding other ingredients at the rates desired. In the mixing chamber the action of the rotor (as will be more fully explained subsequently) is smeared against the surface 12 of the passage 11 and is worked progressively toward the discharge end 35 or left end of the stator as it is shown in Fig. 1. The mixing surface 14 of the rotor extends slightly beyond the discharge end 35 of the stator to facilitate the removal of the mixed rubber from the stator and a suitable receptacle 36 is provided under the discharge end of the stator to receive the mixture. Instead of the receptacle 36, the mixture may be discharged to a suitable conveyor or other means for transferring it to subsequent processing operations.

The charging openings 33 and 34 are spaced apart longitudinally on the stator because it is generally desirable to add various compounding ingredients to rubber at different stages of the mixture. For example, in a typical rubber compound the rubber stock, plasticizers and softeners, etc., may be charged into the opening 33 near the front of the stator. These ingredients are then masticated and mixed and advanced by the rotor toward the discharge end 35 and when this portion of the mixture reaches the rearward opening 34, then such ingredients as carbon black, accelerators, and sulfur may be added to the mixture. Since the opening 33 is normally the one through which the rubber will be charged into the mixing equipment, it is somewhat wider than the opening 34. However, each of the openings are of substantially identical shape and are designed to funnel the materials into the mixing chamber 15. In each of the charging openings the opposite sides 37 (Fig. 1) are perpendicular to the axis of the rotor. The third side 38 (see Fig. 2) of each charging opening is a plane surface which is parallel to the axis of the rotor and disposed substantially tangentially to the surface 12 of the mixing chamber. The fourth side 39, opposite side 38, is inclined inwardly from the top of the stator toward the tangential side 38. The material fed into these openings normally drops into the space at the bottom of the opening close to the tangential side 38 and the rotor is rotated against this material in a direction such that the portion of the rotor exposed at the bottom of the charging opening moves toward the tangential side 38 or, in other words, counter-clockwise as viewed in Fig. 2. Thus, the mixing surface of the rotor progressively forces portions of this material into the mixing chamber 15.

The mixing surface 14 of the rotor is formed with a plurality of protruding ribs 40 which extend longitudinally along the rotor approximately along a generatrix of the surface of revolution 12 and which are spaced apart by flutes 41. The ribs 40 have a gradual helical spiral throughout the length of the rotor which is in the same direction as the rotational direction of the rotor. The mixing surface of the rotor is also gradually tapered from a narrow portion at the front of the stator to a wider portion at the discharge end 35 of the stator and the surface 12 of the passage 11 is also tapered to the same extent. The taper of surface 12 and of the rotor, and also the helical spiral of the ribs 40 contribute to the mixing action as will be subsequently explained. Additionally, the taper of these portions is convenient to permit adjusting the rotational clearance between the ribs of the mixing surface of the rotor and the surface 12 of passage 11 by changing the relative longitudinal position between the rotor and the stator. In this embodiment of the invention, this may be accomplished by loosening the bolts 22 which fit through longitudinal slots 23 in the flanges 24 of the stator and then moving the stator toward or away from one end of the rotor to provide the clearance desired. There is a series of such mixing zones defined by the leading faces of the ribs and the opposing mixing surface 12 of the stator, the mixing zones being circumferentially spaced apart and each being generally wedge-shaped in cross section.

The cross-sectional shape of the ribs 40 and the flutes 41 is more clearly brought out in Figs. 3 and 4 in which they have been drawn to an enlarged scale. Each of the ribs has a crest 44 spaced from the surface 12 of the passage 11 at the desired rotational clearance determined by the relative longitudinal position of the stator and the rotor. The leading face 45 of each rib which is presented to the rubber material during mixing is shaped so that it recedes from the crest 44 toward the flutes 41 in a gradual curve, convex toward the surface 12 of the passage 11 so as to define with the surface 12 a mixing zone converging toward crest 44. The size and shape of each rib is substantially the same throughout the length of the rib and the difference in area of the working surface 14 of the rotor from the front to the discharge end due to the taper is accommodated by making the flutes wider near the discharge end. The curved shape of the leading face 45 of each rib becomes gradually steeper toward the base of the rib and then blends smoothly into the concave or reverse curvature of the flutes 41. Between the crest 44 and the bottom of each flute 41 the shape of the leading face 45 of each rib is in cross-sectional shape, a reverse or ogee curve in the preferred apparatus.

The face 46 of each rib on the side which trails or follows the crest 44 with respect to the rotational direction of the rotor has substantially the same cross-sectional shape as the leading face 45. In the form of the invention illustrated, the preferred shape of the ribs is that from one flute to the next adjacent flute the surface of the ribs is in cross-section a circular arc which connects the curvature of the flutes tangentially. It can be seen in Fig. 3 that the shape of the leading face 45 of each rib is such that there will be a space of appreciable width between the surface 12 of the passage 11 and the bottom of each flute and that this space is progressively narrower toward the crest 44 of each rib.

In operating the equipment the rubber and the ingredients to be mixed are charged into the mixing chamber 15 at a rate such that the mixing chamber is not completely filled by the rubber. The rotation of the rotor against rubber charged into the opening 33, for example, divides the rubber into relatively small banks 48 between the convexly curved leading faces 45 of each rib of the rotor and the surface 12 of the passage 11. The rotation of the rotor exerts pressure on each of these banks tending to urge them radially outward and this pressure is opposed by the surface 12 of the passage 11. The resultant of these opposing forces apparently tends to tumble the banks in a direction parallel to the ribs 40 and to force the bank toward the crest of each rib by sliding it up the convex leading face 45 of the rib. Thus the bank is continuously being forced into the narrow space between the surface 12 of the passage 11 and the crest 44 of the rib where it is forcibly smeared by the rib against the surface 12 of the passage.

With the continued rotation of the rotor, a portion of each bank is progressively removed from each bank and is forced between the crest 44 and the mixing surface 12 in the form of a thin sheet. This portion is also apparently stretched in a direction longitudinally of the rotor toward the discharge end 35 of the stator. This is believed to be caused by both the helical spiral of the ribs and also the fact that the taper of the rotor 40 and surface 12 increases the volume of the mixing chamber toward the discharge end. Each rib is continuously trying to compress its respective bank 48 into the narrow opening between the crest 44 and the surface 12 and since rubber is essentially incompressible, the portion sheeted out of the bank at the top of the crest will naturally flow toward the portion of the mixing chamber of greater volume. There is also believed to be some stretching of the rubber in a direction circumferentially of the rotor but the major stretching occurs in the longitudinal direction. It will be noted in the drawings that the discharge opening from the mixing chamber is a non-throttling opening; i.e. the opening is unobstructed so that the stock banks or ribbons emerge freely from the discharge opening without any appreciable back pressure being built up inside the mixing chamber.

Substantially as fast as the portion of each bank is urged across the crest 44 it is assimilated into the bank of material on the next succeeding rib and thus there is a continuous interchange of small quantities of material from bank to bank and each of these quantities is forcibly smeared against the surface 12 by the rib as it is being transferred to another bank. The stock emerges from the discharge end of the rotor in long twisted ribbons. The action of the rotor has been found to be self-cleaning. In the event that a particularly sticky or tacky stock adheres to the mixing surfaces inside, the equipment may be cleaned by merely dropping into the hopper 33 a rubber which is relatively dry and which will mix with the tacky stock, and in turn be discharged from the end of the rotor.

The smearing and stretching action of the ribs is generally comparable to the smearing action obtained in open mill mixing and this apparently tends to break down the nerve of the rubber and at the same time crush the finely-divided ingredients into the particles of rubber. To investigate the actual distribution of the ingredients mixed in this equipment a rubber which was colored white was added at the first opening 33 in the equipment shown in Fig. 1 and then a very small quantity of carbon black added at the second opening. After a brief period of mixing before the stock reached the discharge end of the stator, the upper housing 25 of the stator was removed, and it was found that the stock was uniformly gray throughout.

The dispersion of carbon black into rubber has also been studied by the following test: Fifty parts of Easy Processing Channel Black and 100 parts of Butyl rubber (copolymer of isobutylene with a small proportion of butadiene or isoprene) were mixed by passing the material once through apparatus similar to that of Fig. 1 while it was maintained at a temperature of about 80° F. and the clearance between the ribs of the rotor and the surface 12 of the stator at about .003 to .004 inch. The mixed rubber stock collected at the discharge end was then dissolved in carbon tetrachloride and deposited on electron microscope slides. The rubber on the slides was then evaporated leaving the channel black on the slides. The same composition of rubber was also prepared on an open mill at the same temperature and with substantially the same clearance. Examination of the slides of each of these compositions under the electron microscope showed distribution of the channel black was as uniform in the equipment of this invention as with that mixed in the open mill.

The particular shape of the leading face 45 of each rib is determined with regard to the coefficient of sliding friction between the mixture and the face 45 of the rib. It is desirable that the rubber tend to slide up the leading face 45 toward the crest of the rib under the rotational pressure to obtain the desired smearing action. While there is believed to be a critical angle at which the leading face 45 of each rib should be inclined for each material, it is obviously impractical to attempt to design equipment for exactly each material mixed and also in the course of making a single mixture the coefficient of friction will change during the various stages of the mixture. The curvature of the leading face 45 as shown in Figs. 3 and 4 is such that for mixing a material having a low coefficient of friction on the surface of the ribs, substantially all the bank will be urged toward the crest during the rotation, whereas if the coefficient of friction is high, at least the portions of the bank nearer the crest will be urged toward the crest.

Fig. 4 shows further details about the shape of the leading face 45 of each rib on a rotor which has been found suitable for mixing rubber compounds. As indicated in Fig. 4, a line T tangent to the leading face 45 at the point 49 where it blends into the curvature of the flutes makes an angle "$a$" of about 40° with the line R connecting the crest 44 and the rotational axis of the rotor. Preferably for mixing rubber this angle will always be greater than about 25°. Tangents $T_1$, $T_2$ etc. to the leading face 45 at other points between the point 49 and the crest 44 make a progressively greater angle with the line drawn from the crest to the axis of the rotor.

Additionally this rotor and the surface of the passage in which the rotor operated were tapered from the front toward the discharge end 35 of the stator and an angle of 0°–46′ with respect to the rotational axis of the rotor. The lead of the helical spiral of the ribs was such that the ends of the ribs at the discharge end of the rotor were offset an angle of 71°–15′ from the ends of the same ribs at the forward end of the rotor and the mixing surface 14 of the rotor was approximately one (1) foot long. The mixing surface 14 contained nine ribs, equally spaced, and the cross-sectional shape of the ribs from one flute to the next was a circular arc having a radius of 0.375 inch.

An example of a typical mixture or rubber stock compounded in this equipment is as follows:

Example 1

A stock was mixed according to the following recipe:

| Material: | Parts by weight |
| --- | --- |
| LT-GR-S | 100.0 |
| Easy Processing Channel Black | 50.0 |
| Zinc oxide | 5.0 |
| Stearic acid | 1.5 |
| Accelerator | 1.75 |
| Sulfur | 2.0 |

The accelerator was benzothiazyl disulfide. The rubber and curing agents (zinc oxide, sulfur and accelerator) were added at the first hopper and the carbon black by means of an automatic dispenser at the second hopper. The rubber and curing agent were added in small portions at frequent intervals to simulate continuous feeding. The temperature of the stator jacket was controlled at the level between 70 and 80° F. and the rotational clearance between the crest 44 of the ribs and the surface 12 of the passage 11 was .012 inch. The stock mixture issuing from the discharge end 35 of the stator was shiny and would not mark white paper. It was of acceptable commercial standard.

Example 2

Another stock was prepared according to the following recipe:

| Material: | Parts by weight |
| --- | --- |
| Hycar 1001 | 100.0 |
| Zinc oxide | 5.0 |
| Accelerator | 1.0 |
| Easy Processing Channel Black | 50.0 |
| Sulfur | 1.5 |

The accelerator was benzothiazyl disulfide. This stock was mixed in the same equipment and under the same conditions as the stock in Example 1. The stock mixture issuing from the discharge end was shiny and black and would not mark white paper.

Figs. 5–12 show various types of mixing equipment embodying the principles of this invention.

In the embodiment of the invention shown in Figs. 5 and 6, the stator 50 is constructed in substantially the same manner as the stator 10 of Fig. 1, and it is adjustably secured to a frame 51 by an adjusting screw mechanism 52. Through the stator 50 there is a longitudinal passage 53 in which a rotor 55 is rotatably supported by a bearing 56 at the left end of the rotor. The rotor 55 along the portion enclosed by the passage 53 has a mixing surface 57 which includes longitudinal ribs 58 spaced apart by flutes 59, each having the same cross-sectional shape as the ribs 40 and flutes 41 described in Figs. 1–4 except that in Fig. 5 the ribs 58 are not disposed helically along the rotor but extend generally parallel to the rotational axis of the rotor. The mixing surface 57 of the rotor is gradually tapered from the front end 60 to the discharge end 61 adjacent bearing 56. The surface of the passage 53 is also tapered the same extent. The rotor is also hollow as indicated at 62 in Fig. 6 so that a thermal medium may be circulated through the rotor as well as the stator.

The substantial difference between the embodiment shown in Fig. 5 and that in Fig. 1 is in the mode in which the stock is delivered to the mixing chamber. In the species shown in Fig. 5, the forward end of the stator surrounding end 60 of the rotor has a tube 64 secured to it which extends coaxially of the rotor forwardly from the front end of the stator. The tube 64 has an opening 65 in its upper side near the end remote from the stator through which rubber and ingredients may be charged into the tube. In the tube there is a plunger 66 which is operated by a pressure cylinder 67 to urge the plunger toward and away from the stator inside the tube. The stroke of the plunger 66 is regulated so that with the plunger withdrawn to the right the opening 65 is exposed for insertion of the material and as the plunger is moved toward the stator, the material is delivered to the front end 61 of the rotor.

The front end 60 of the rotor has a smooth surface and is shaped essentially like a paraboloid. This smooth surface blends smoothly into the ribs 58 and flutes 59 so that material urged against the end 60 of the rotor is channeled over this end surface and inside the passage 53 through the stator. The speed at which the plunger operates is regulated so that the material does not completely fill the flutes 59 and other spaces between the ribs. As the rotor is rotated, the mixing action is essentially the same as described in connection with the rotor 13 in Fig. 1. The rubber mixture due to the tapered shape of the rotor and of the rotation of the rotor is worked rearwardly toward the discharge end 61 of the rotor and issues from the stator into a suitable receptacle 68 supported on the frame 51. The rubber mixture advances through the stator toward the discharge end 61 by the mixing action imparted to it by the rotor, the plunger functioning to deliver the material to the stator.

The rotor 70 shown in Fig. 7 differs from the rotor of Fig. 5 in that the rotor in Fig. 7 has gradually helically disposed ribs 71 rather than straight ribs. The rotor shown in Fig. 7 may be substituted for that shown in Fig. 5 with equal efficiency.

The modification of the invention illustrated in Fig. 8 differs from that shown in Fig. 5 in that the rotor 75 is not tapered and the passage 76 through the stator 77 in which the rotor operates is cylindrical.

The modification of the invention illustrated in Figs. 10 and 11 differs from that shown in Fig. 5 in that the rotor 80 employed has essentially a smooth tapered mixing surface 81 and the surface of the passage 82 through the stator 83 in which the rotor is mounted has alternately spaced ribs 84 and flutes 85 extending the length of the stator. The mixing action obtained with this rotor and stator are essentially the same as that described in connection with the rotor 13 of Fig. 1.

The modification of the invention shown in Fig. 12 differs from that shown in Fig. 5 in that a screw 90 is substituted for the plunger 66 to feed the material to the end of the rotor 91 in the stator 92. The screw advantageously provides for continuous feeding of the rubber into the mixing chamber and is somewhat more conveniently used in many operations in place of the plunger 66 of Fig. 5.

Variations of the invention may be made within the scope of the accompanying claims.

I claim:

1. Apparatus for mechanically homogenizing and kneading plastic masses comprising a rotatable conical body and a closely adjacent surrounding conical sleeve forming a conical space which is of substantially uniform width throughout its length and is entirely open and unobstructed at its greatest diameter, means for introducing a plastic mass into the space between said body and said sleeve in the vicinity of the smaller diameter of said body, and space ribs on said rotatable conical body approximately filling the space between said body and said sleeve and extending in the general direction of the axis of said body.

2. Apparatus according to claim 1, in which said ribs are arranged slantwise with respect to the axis of said rotatable body.

3. Apparatus for mechanically homogenizing and kneading plastic masses comprising a rotatable generally conical body and an adjacent surrounding generally conical sleeve forming an annular mixing chamber which is of substantially uniform width throughout its length and which has a non-throttling discharge opening at its greatest diameter, means for introducing a plastic mass into the space between the body and said sleeve in the vicinity of the smaller diameter of said body, and spaced ribs on said rotatable body approximately filling the space between said body and said sleeve and extending in the general direction of the axis of said body, each said rib having a smooth crest and a leading face blending into said crest in a smooth convex curve, said leading face slanting gradually away from the opposing surface of said sleeve and defining therewith and with said crest a generally wedge-shaped mixing zone, communicating with said non-throttling discharge opening.

4. Apparatus according to claim 3 wherein said ribs are disposed at an angle to the axis of said rotatable body.

5. In an apparatus for mechanically plasticizing and mixing plasticizable material, the combination consisting of two concentric relatively rotatable mixing members one of which has an annular mixing surface which is circumferentially continuous and the other of which presents a plurality of circumferentially spaced-apart local mixing surface regions in opposed relation to said annular continuous mixing surface, said members defining between their respective mixing surfaces and annular mixing chamber; means for introducing a charge of plasticizable material into said mixing chamber at a predetermined charging zone of said chamber; a non-throttling discharge opening from said mixing chamber in a location thereof spaced from said charging zone; said local mixing surface regions being oriented so that each slants gradually away from said opposing continuous mixing surface in the circumferential direction thereof and each said local region at least along its portion closest to said continuous surface being curved convexly to said opposing continuous surface, said gradually slanting local mixing surface regions forming with said continuous mixing surface a series of circumferentially spaced mixing zones of generally wedge-shaped cross section which series of wedge-shaped zones extends continuously between and communicates with said charging zone and said discharge zone; and means for relatively rotating said members to divide a charge at said charging zone into individual wedge-shaped banks in said mixing zones and to advance said banks through said mixing zones by progressively squeezing the banks toward the narrower regions of the mixing zones and to discharge said banks without throttling the flow thereof.

6. In an apparatus for mechanically plasticizing and mixing plasticizable material, the combination consisting of two concentric relatively rotatable mixing members having opposing mixing surfaces defining an annular mixing chamber; means for introducing a charge into said mixing chamber at a predetermined charging zone therein; a non-throttling discharge opening from said mixing chamber at a location remote from said charging zone; one of said mixing members having its mixing surface annular and circumferentially continuous between said charging zone and said discharge opening, the other of said mixing members having on its mixing surface a plurality of circumferentially-shaped ribs extending generally lengthwise of the mixing chamber from said charging zone to said discharge opening, the ribs having crests closely spaced from the opposing annular mixing surface and leading faces which slant gradually toward the opposing annular mixing surface in the circumferential direction of the latter as such faces approach their respective crests thereby defining a series of circumferentially spaced gradually converging mixing zones generally of wedge-spaced cross section, said series of wedge-shaped mixing zones communicating both with said chraging zone and said discharge opening and extending continuously therebetween, and means for relatively-rotating said mixing members to sub-divide a charge at said charging zone into wedge-shaped banks in said mixing zones and to advance said banks lengthwise through said zones by progressively squeezing the banks toward the narrower regions of said mixing zones and to discharge said banks without throttling at said discharge zone.

7. Apparatus according to claim 6 wherein the leading face of each rib blends smoothly into its respective crest in a curve convex to the opposing annular mixing surface.

8. Apparatus according to claim 6 wherein the leading face of each rib is curved convexly to said opposing annular mixing surface so that said mixing zones in cross section are shaped generally like one of the vertex regions of a crescent.

9. Apparatus according to claim 6 wherein one of said mixing members is a tubular stator and the other is a rotor extending through the stator.

10. Apparatus according to claim 6 in which said ribs are disposed helically relative to the rotational axis of the mixing members.

11. The apparatus of claim 6 in which said annular mixing surface of one mixing member and the other mixing member along the regions of the crests of said ribs are generally tapered away from the rotational axis of the mixing members in the direction of the discharge opening so that said annular mixing chamber progressively increases in volume from the region thereof adjacent said charging zone.

12. Apparatus according to claim 6 wherein said means for introducing a charge into said mixing chamber includes means disposed axially of the mixing chamber for forcing the charge toward said chamber.

13. Apparatus according to claim 6 wherein said means for introducing a charge into said mixing chamber is a feed screw disposed axially of the mixing chamber.

14. Apparatus according to claim 6 wherein said means for introducing a charge into said mixing chamber is an opening through one of said mixing members into the mixing chamber transverse to the rotational axis of said members.

15. The method of mechanically plasticizing and mixing plasticizable material which comprises introducing a charge of material into a predetermined charging zone of a confined annular mixing chamber defined by opposing annular concentric mixing surfaces; limiting the quantity of charge introduced to a volume smaller than the volume of the mixing chamber; relatively rotating said mixing surfaces to subdivide substantially the entire charge into a plurality of individual circumferentially-spaced wedge-shaped banks confined between local opposed regions of the mixing surfaces defining a series of circumferentially-spaced wedge-shaped mixing zones, and to advance said wedge-shaped banks lengthwise of the mixing chamber in such mixing zones toward a discharge opening remote from said charging location; maintaining the progression of said banks toward said discharged opening primarily by the squeezing pressure on the banks as they are urged into the narrower regions of said mixing zones as a result of said relative rotation of said mixing surfaces; maintaining said banks free from throttling as they are so advanced in said zones; and discharging said banks without throttling through said discharge opening.

References Cited in the file of this patent

UNITED STATES PATENTS

| | | |
|---|---|---|
| 1,508,109 | Lovejoy | Sept. 9, 1924 |
| 2,295,362 | Schnuck | Sept. 8, 1942 |
| 2,453,088 | Dulmage | Nov. 2, 1948 |
| 2,779,054 | Doriat et al. | Jan. 29, 1957 |

UNITED STATES PATENT OFFICE

CERTIFICATE OF CORRECTION

Patent No. 2,894,280                                 July 14, 1959

Arthur E. Juve

It is hereby certified that error appears in the printed specification of the above numbered patent requiring correction and that the said Letters Patent should read as corrected below.

Column 8, line 62, for "space" read -- spaced --; column 9, line 58, for "shaped" read -- spaced --; line 67, for "spaced" read -- shaped --; line 69, for "chraging" read -- charging --.

Signed and sealed this 29th day of December 1959.

(SEAL)
Attest:

KARL H. AXLINE                                        ROBERT C. WATSON
Attesting Officer                                     Commissioner of Patents